(12) United States Patent
Riegger et al.

(10) Patent No.: US 7,559,195 B2
(45) Date of Patent: Jul. 14, 2009

(54) PROCEDURE AND DEVICE TO HEAT A REDUCING AGENT GENERATION SYSTEM

(75) Inventors: Peter Riegger, Stuttgart (DE); Franz Josef Trompeter, Freibert A.N. (DE); Ralf Wegst, Gaggenau (DE); Thorsten Raatz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 11/599,888

(22) Filed: Nov. 14, 2006

(65) Prior Publication Data
US 2007/0119154 A1 May 31, 2007

(30) Foreign Application Priority Data

| | | | |
|---|---|---|---|
| Nov. 14, 2005 | (DE) | ......................... | 10 2005 054 129 |
| Dec. 27, 2005 | (DE) | ......................... | 10 2005 062 556 |
| Apr. 24, 2006 | (DE) | ......................... | 10 2006 018 955 |
| May 4, 2006 | (DE) | ......................... | 10 2006 020 693 |
| May 9, 2006 | (DE) | ......................... | 10 2006 021 490 |
| May 11, 2006 | (DE) | ......................... | 10 2006 021 987 |
| May 12, 2006 | (DE) | ......................... | 10 2006 022 385 |
| May 17, 2006 | (DE) | ......................... | 10 2006 022 992 |
| May 18, 2006 | (DE) | ......................... | 10 2006 023 338 |
| Sep. 14, 2006 | (DE) | ......................... | 10 2006 043 087 |

(51) Int. Cl.
*F01N 3/00* (2006.01)
(52) U.S. Cl. .............................. 60/286; 60/274; 60/275; 60/295; 60/301; 60/303
(58) Field of Classification Search .................. 60/274, 60/275, 286, 301, 303, 295
See application file for complete search history.

(56) References Cited

U.S. PATENT DOCUMENTS

| | | | | |
|---|---|---|---|---|
| 5,749,937 | A * | 5/1998 | Detering et al. | ............ 75/10.19 |
| 6,892,529 | B2 * | 5/2005 | Duvinage et al. | ............. 60/286 |
| 7,082,753 | B2 * | 8/2006 | Dalla Betta et al. | ........... 60/286 |
| 7,254,939 | B2 * | 8/2007 | Duvinage et al. | ............. 60/286 |
| 2006/0101809 | A1 * | 5/2006 | Bodo et al. | .................... 60/286 |

FOREIGN PATENT DOCUMENTS

| | | |
|---|---|---|
| DE | 199 22 961 C2 | 11/2000 |
| WO | WO 01 14702 | 3/2001 |

* cited by examiner

*Primary Examiner*—Thomas E Denion
*Assistant Examiner*—Diem Tran
(74) *Attorney, Agent, or Firm*—Merchant & Gould PC

(57) ABSTRACT

The invention concerns a procedure to heat a reducing agent generation system of an exhaust gas aftertreatment system of an internal combustion engine by combustion of fuel, whereby the reducing agent is produced for the selective catalytic reduction of nitrogen oxides in the exhaust gas of the internal combustion engine in the intermittently operated reducing agent generation system, whereby the reducing agent generation system consists of a plasma burner, a mixing chamber located downstream or upstream from the plasma chamber, an oxidation reformation unit as well as a nitrogen oxide storage/ammonia production unit and whereby nitrogen oxide is produced in a plasma in the plasma burner. The invention concerns additionally a corresponding device.

The task of the invention concerning the procedure is thereby solved, in that the combustion of the fuel is ignited by the plasma. For this reason, the heating of the catalytic components required at the start of the reducing agent generation system results through the combustion of fuel by means of a burner functionality, which consists of a fuel metering mechanism and the existing plasma burner. A special heating burner as an auxiliary mechanism can be omitted.

12 Claims, 1 Drawing Sheet

PROCEDURE AND DEVICE TO HEAT A REDUCING AGENT GENERATION SYSTEM

BACKGROUND

In the German patent DE 199 22 961 C2 an emission control system for the purification of the exhaust gas of a combustion source, especially the internal combustion engine of a motor vehicle, is described at least by the nitrogen oxides contained therein with an ammonia producing catalytic converter for the production of ammonia using components of at least one part of the exhaust gas emitted from the combustion source during the ammonia producing operational phases and with a nitrogen oxide reduction catalytic converter subsequently connected to the ammonia production catalytic converter for the reduction of the nitrogen oxides contained in the exhaust gas emitted from the combustion source using the ammonia produced as a reducing agent. Provision is made thereby for a nitrogen oxide production unit external to the combustion source for the enrichment of the exhaust gas supplied to the ammonia production catalytic converter with the nitrogen oxide it produces during the ammonia producing operational phases. A plasma generator is proposed, for example, as a nitrogen oxide production unit for the plasma engineered oxidation of the nitrogen contained in a gas stream, which is supplied, to nitrogen oxide. The hydrogen required for the ammonia production is produced during the ammonia production operational phases by the operation of the combustion source with a rich, i.e. fuel rich air ratio.

A plasma chemical procedure to produce a hydrogen rich gas mixture is described in the patent WO 01/14702 A1. With the procedure, a rich fuel-air-mixture is dealt with in an arc, preferably under POx conditions.

In order to avoid the transport of an additional resource, a plasma procedure was proposed by the applicant in a still unpublished writing for the on-board-generation of reducing agents. In so doing, necessary ammonia from non-toxic substances are produced according to need in the vehicle and subsequently supplied to the SCR-process. An acceptable solution with regard to the fuel consumption is afforded thereby by an intermittently operated procedure for ammonia production, which likewise is proposed in this writing. This procedure is denoted as follows as the RGS-procedure (Reductant Generating System) or the reducing agent generating system.

A disadvantage of this procedure is that especially in the starting phase the reducing agent generation system (RGS) only very slowly achieves an adequately high operating temperature, at which an optimal functionality is guaranteed. The strategy up to the present makes provision for a burner functionality, which makes possible for the system to be made operational, especially the catalytic components for partial oxidation at approximately 500E C and the ammonia production unit at approximately 250E C. For that purpose, provision is made for a diesel fuel combustion in a flame to be contingently supported by a catalytic combustion within the catalytic components.

A disadvantage is that an additional mechanism is required to heat the reducing agent generation system (RGS) up to full operating status.

It is therefore the task of the invention to provide a procedure, in which on the one hand allows for the quick achievement of an optimal operating temperature of the RGS-unit and on the other hand minimizes the expenditure for auxiliary mechanisms. It is furthermore the task of the invention, to provide at this point a suitable device.

SUMMARY

The invention concerns a procedure to heat a reducing agent generation system of an exhaust gas aftertreatment system of an internal combustion engine by combustion of fuel, whereby the reducing agent for the selective catalytic reduction of nitrogen oxides in the exhaust gas of the internal combustion engine is produced in the intermittently operated reducing agent generation system, whereby the reducing agent generation system consists of a plasma burner, a mixing chamber located either upstream or downstream from the plasma chamber, an oxidation reformation unit as well as a combined nitrogen oxide storage/ammonia generation unit and whereby nitrogen oxide is produced in a plasma in the plasma burner.

The invention additionally concerns a device to heat up a reducing agent generation system of an exhaust gas aftertreatment system of an internal combustion engine by combustion of fuel, which can be metered in by way of a fuel metering mechanism, whereby the reducing agent generation system consists of a plasma burner, a mixing chamber located downstream or upstream from the plasma burner, an oxidation reformation unit as well as a combined nitrogen oxide storage/ammonia generation unit for the intermittent production of ammonia from fuel and air and/or exhaust gas for the selective reduction of nitrogen oxides in the exhaust gas of the internal combustion engine.

In context with future legal regulations with regard to nitrogen oxide emissions from motor vehicles, an exhaust gas aftertreatment is required. The selective catalytic reduction (SCR) can be deployed to reduce the nitrogen oxide emissions (denitrogenation) of internal combustion engines, especially of diesel motors, with chronologically predominantly lean, i.e. oxygen rich exhaust gas. In so doing, a defined amount of a selectively acting reducing agent is added to the exhaust gas. This can, for example, be in the form of ammonia, which is metered in directly as a gas, which is derived from a precursor substance in the form of urea or from a urea-water-solution (HWL).

The task of the invention concerning the procedure is thereby solved, in that the combustion of the fuel is ignited by the plasma. In so doing, the required heating of the catalytic components at the start of the reducing agent generation system can result by combustion of fuel by means of a burner functionality, which consists of a fuel metering mechanism and the plasma burner, which is present in any case. An independent heating burner as an auxiliary mechanism can be omitted.

If the fuel is supplied to a mixing chamber upstream from the plasma chamber, a reliable ignition of the fuel for the burner operation can be achieved by utilization of the entire length of the plasma. Furthermore, the fuel-air-mixture in the hydrogen production phase runs through the entire area previously heated up by the plasma, whereby the fuel is definitely vaporized.

Provision is made in one form of embodiment for the fuel to be supplied to one of the mixing chambers downstream from the plasma chamber and for the plasma to be fed into the mixing chamber lying downstream. In so doing, the mixing chamber downstream is heated, in order to reliably vaporize the fuel in the hydrogen production phase, and on the other hand the fuel can be ignited to heat up the catalytic components. In the phase of the nitrogen oxide production the long plasma area causes a high nitrogen yield.

If nitrogen oxide in the plasma of the plasma burner is produced in a nitrogen oxide production phase, and in a subsequent ignition phase fuel is metered into the mixing chamber (41, 42) located upstream or downstream from the plasma chamber and is ignited by the plasma (30), and in a subsequent heating phase the plasma is turned off, whereby fuel is additionally metered into a mixing chamber located either upstream or downstream from the plasma chamber and combusted, and in a subsequent hydrogen production phase the fuel combustion is completed and fuel is vaporized in the mixing chamber located upstream or downstream from the plasma chamber, the burner function required to heat up the reducing agent generation system as well as the production of nitrogen oxide and hydrogen for the production of the reducing agent can be implemented with a simple and cost effective system.

A reliable ignition of the fuel-air-mixture for the burner operation is achieved, in that the plasma is additionally operated for a selective time duration, preferably for a time duration between one and five seconds, after the beginning of the metering in of the fuel.

If the fuel is vaporized before combustion on a hot surface area, which was heated up during the nitrogen oxide generation phase of the mixing chamber located either upstream or downstream from the plasma chamber, an atomization of the fuel can occur with a fuel pressure of maximally 4 bar as it exists in normally deployed systems. Without the auxiliary heating, a fuel pressure of typically 10 bar would be required, which would mean additional complexity of components.

An improved vaporization of the fuel can be achieved, in that the fuel supplied and/or the air supplied is heated in the counter flow on the outside cladding of the plasma burner.

The task concerning the device of the invention is solved, in that provision is made for a plasma of the plasma burner to ignite the fuel. In this way the deployment of a separate ignition mechanism is unnecessary. Such a mechanism would include a glow plug or a separate burner unit to heat the catalytic components of the reducing agent generation system.

If the plasma of the plasma burner is designed for one or more plasma jet zones, the fuel-air-mixture can be reliably ignited for the burner operation, especially with the execution with several plasma jet zones.

If a housing of the plasma burner has a tapered interior area in the area subsequent to the plasma chamber in the direction of the gas flow; in collaboration with the gas flow, the plasma can extend itself across an especially long area and can develop a plasma jet escaping from the housing.

If the plasma jet zones are disposed tangentially around an ignition area or linearly along an ignition area, the fuel-air-mixture can be impressed with a swirl, which leads to a particularly good mixture or a long ignition area is developed, which likewise improves the combustion.

If provision is made for a flame holder between the fuel metering mechanism and the ignition area, the flame burns more stably and an extinguishment can be avoided.

If provision is made for two fuel metering mechanisms for the fuel delivery during the heating up and for the fuel delivery during a $H_2/CO$ production phase, provision can be made for an advantageous arrangement in each case for both modes of operation. If provision is made for a joint fuel metering mechanism, the arrangement is especially cost effective.

BRIEF DESCRIPTION OF THE DRAWINGS

The invention is explained in more detail in the following manner using the examples of embodiment depicted in the figures. The following figures are shown.

DETAILED DESCRIPTION

Figure 1:
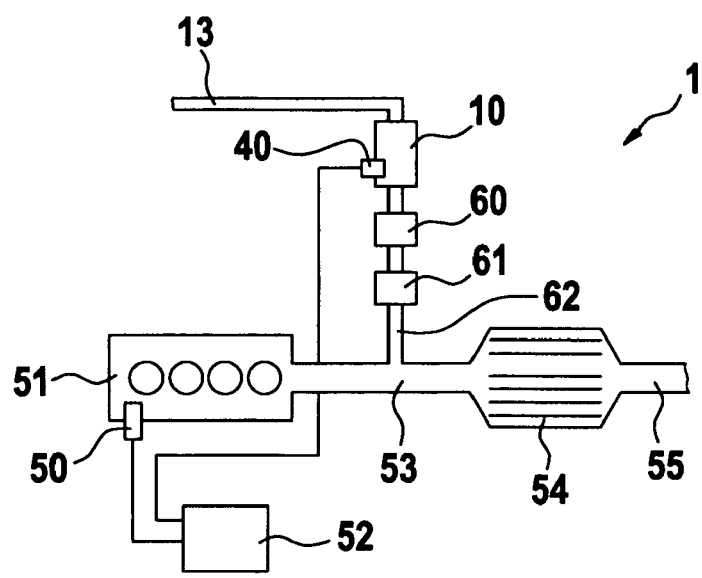
FIG. 1 a schematic depiction of an exhaust gas aftertreatment system of an internal combustion engine with a reducing agent generation system, FIG. 2 a plasma burner for the reducing agent generation system FIG. 3 the plasma burner in an alternative embodiment.

FIG. 1 shows schematically the technical layout using the example of a diesel motor, in which the procedure according to the invention can be applied. An internal combustion engine 50 is depicted with an exhaust gas duct, a SCR-catalytic converter connected to the duct for the selective catalytic reduction (SCR) of the exhaust gas of the internal combustion engine 50, an exhaust gas outlet connected to the SCR-catalytic converter and a reducing agent generation system 1. The reducing agent generation system 1 provides for the production of ammonia, which is stored in the SCR-catalytic converter and converts nitrogen oxides from the exhaust gas of the internal combustion engine 50 to water and nitrogen. The reducing agent generation system 1 consists of a plasma burner 10, a subsequently connected oxidation reformation unit 60 and a nitrogen oxide storage/ammonia production unit 61, from which the ammonia can be metered in by way of a reducing agent feed 62 into the exhaust gas duct 53 in front of the SCR-catalytic converter. Air and/or exhaust gas can be fed to the plasma burner by way of a first air feed 13; and by way of a fuel metering device 40, fuel as a basic material for the production of ammonia can at least periodically be fed.

The production of ammonia results within the reducing agent generation system 1, in which nitrate monoxide NO in a lean phase ($\lambda>1$) is produced in a plasma 30, which is not depicted here, within the plasma burner 10 from air and/or exhaust gas. The nitrogen oxides flow through the adjoining oxidation reformation unit 60 and are subsequently delivered in the example shown to a combined nitrogen oxide storage/ammonia generation unit 61 and stored there. In a second operating phase subsequently connecting to the lean phase, the rich phase ($0.33<\lambda<1$), liquid fuel is metered into the plasma burner, vaporized and converted in the oxidation reformation unit 60 to a gas mixture containing hydrogen and carbon monoxide, which subsequently converts the previously stored nitrogen oxides to ammonia in the nitrogen oxide storage/ammonia production unit 61. This gaseous ammonia, which has been produced, is then metered into the exhaust gas stream of the exhaust gas duct 53 in front of the SCR-catalytic converter.

As the SCR-catalytic converter 54 possesses an ammonia storage capability, it is also possible by means of an intermittent procedure for ammonia production to achieve continuously the reduction of the nitrogen oxides by means of the SCR-process in the exhaust gas stream. In so doing, catalytic converters from, for example, titanium dioxide ($TiO_2$) and vanadium-pentoxide ($V_2O_5$) convert the nitrogen oxides with the ammonia generated at a high rate in the temperature range between 150° C. and 450° C.

In order to achieve in the starting phase a quick heating of the components of the reducing agent generation system 1, especially by the oxidation reformation unit 60 and the nitrogen oxide storage/ammonia production unit 61, the plasma burner 10 has according to the invention a functionality for the combustion of fuel, which is described in the following way. A quick operating status of the reducing agent generation system 1 is achieved with this burner functionality, so that a high ammonia generation rate is accomplished already very early.

Figure 2:
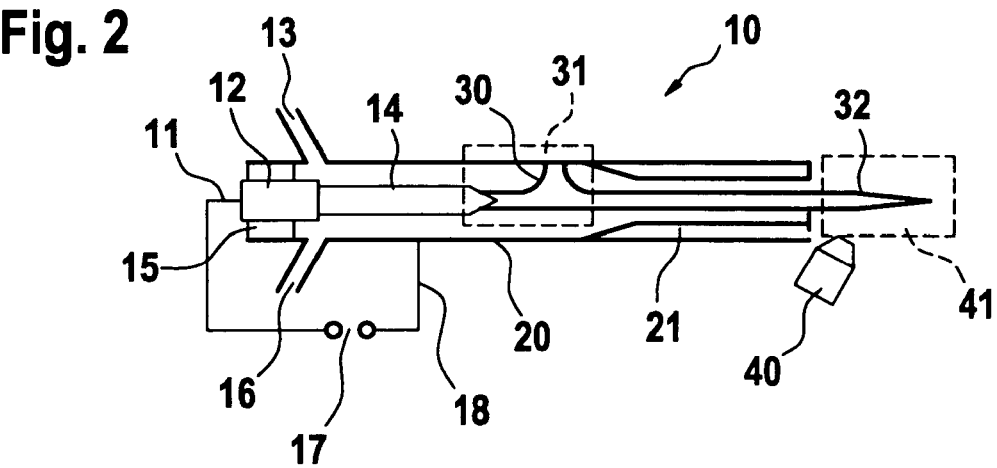

FIG. 2 shows a plasma burner 10 with a housing 20, in which an electrode 14 is attached to an electrode holder 12, which is electrically separated from the housing 20 by an insulator 15. Between the electrode 14 and the housing 20 the plasma 30 can be ignited in a plasma chamber 31 and kept going, in that a high voltage is impressed by a high voltage source 17 between a first high voltage terminal 11 at the electrode holder 12 and a second high voltage terminal 18 at the housing. The high voltage can thereby be a DC voltage or a high frequency voltage. Air by way of the first air feed 13 or additional ones, for example executed by a second air feed 16, is delivered to the plasma chamber 31. The housing 20 has in the direction of flow in an area downstream from the plasma chamber a tapered interior area, so that the plasma develops a plasma jet, which extends beyond the housing 20 and develops an escaping plasma jet 32. Depending upon the form of the tapered interior area 21 and the gas flow, the plasma 30 can in the area of the tapered interior area 21 can be dead or partially active, whereby a current-carrying plasma has a higher temperature. In the area of the escaping plasma jet 32, the fuel metering mechanism 40 is disposed, which can meter fuel into a subsequently connected mixing chamber.

In a first mode of operation of the plasma burner 10, air by means of a first air feed 13 and a second air feed 16 is delivered past the electrode 14 to the plasma chamber 31. By means of the burning plasma in the succeeding area, nitrogen oxides are produced, which in the unspecified additional components of the reducing agent generation system 1 are used for the production of ammonia.

In a second mode of operation of the plasma burner 10, the plasma is produced and by way of the fuel metering mechanism 40 meters fuel into the subsequently connected mixing chamber 41. The fuel vaporizes on the hot cladding of the subsequently connected mixing chamber 41, is ignited by the escaping plasma jet developed in the plasma 30 and forms a burner flame. If the fuel is reliably ignited, the high voltage source 17 can be turned off and the additionally metered in fuel ignites at the existing burner flame. Provision can be made for a flame holder to stabilize the operation. This mode of operation serves to heat up the catalytic components of the reducing agent generation system 1. The second mode of operation is ended, in that the fuel supply is interrupted, so that the burner flame extinguishes.

In a third mode of operation, when the plasma 30 is turned off, fuel is metered into the hot subsequently connected mixing chamber 41. The fuel vaporizes and can be converted to hydrogen, which serves to produce ammonia, in the oxidation reformation unit 60, which is not depicted here. Additionally by-products arise like carbon monoxide and hydrocarbons.

Figure 3:
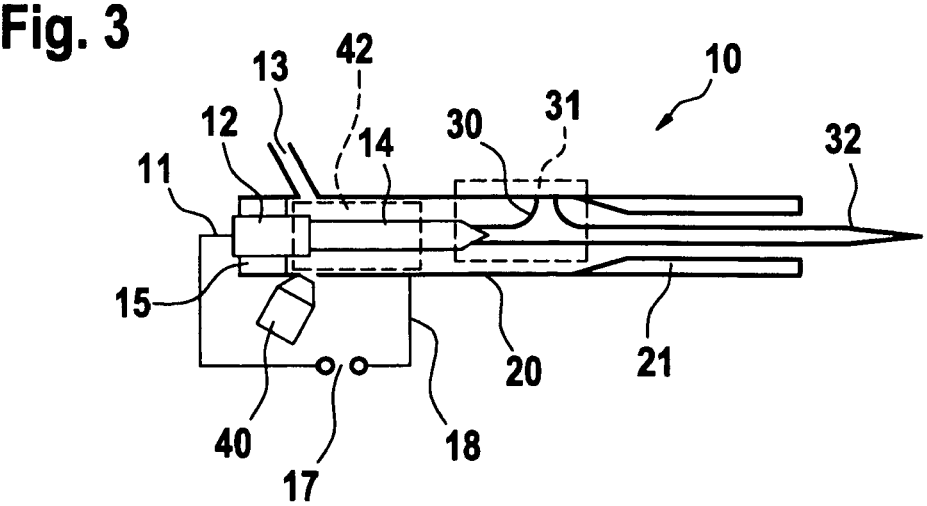

In a modified embodiment of the plasma burner 10 depicted in FIG. 3, the fuel metering mechanism 40 is disposed in the direction of gas flow in front of the plasma chamber 31. In the second mode of operation of the plasma burner 10, fuel is metered into a mixing chamber 42 located upstream from it with the fuel metering mechanism 40. The fuel vaporizes there on walls heated in the previous first operational phase and ignites in the plasma 30 located downstream in the direction of gas flow. For an improvement in the vaporization, the incoming air and/or the fuel can thereby be warmed at the housing 20 in accordance with the counter current principle. The advantage of this arrangement is that the fuel runs through a long plasma zone and reliably ignites. If the fuel ignites reliably, the high voltage source 17 can be switched off and the fuel, which is additionally metered in, ignites at the existing burner flame. Provision can be made for a flame holder to stabilize the operation. This mode of operation serves to heat up the catalytic components of the reducing agent generation system 1. The second mode of operation is ended, in that the fuel supply is interrupted, so that the burner flame extinguishes.

In the third mode of operation, when the plasma 30 is turned off, fuel is metered into the hot mixing chamber 42 located upstream. The fuel vaporizes there and in the plasma chamber 31 heated by the plasma 30 as well as in the tapered interior area 21 of the housing 20.

The previously described procedural variations of the second mode of operation of the plasma burner 10 are implemented with the executions of the device previously described, especially during a cold start and/or when restarting the exhaust gas aftertreatment system. As a result a quick heating of the reducing agent generation system 1 with its components can be achieved, whereby the supplying of ammonia as a reducing agent is accelerated and a quick system start of the exhaust gas aftertreatment system is made possible.

Basically the device and the procedure can be deployed in all motor vehicles with diesel or other lean engines, which are operated with other fuels, in which a reducing agent generation system 1 is deployed.

The invention claimed is:

1. A method of heating up a reducing agent generation system of an exhaust gas aftertreatment system of an internal combustion engine by combustion of fuel, the reducing agent generation system comprising a plasma burner, a mixing chamber located downstream or upstream from the plasma chamber, an oxidation reformation unit, and a combined nitrogen oxide storage and ammonia production unit, the method comprising:
   producing the reducing agent for selective catalytic reduction of nitrogen oxides in an exhaust gas of the internal combustion engine in the intermittently operated reducing agent generation system;
   producing nitrogen oxide in a plasma in the plasma burner, wherein the combustion of the fuel is ignited by the plasma;
   producing nitrogen oxide in a nitrogen oxide production phase, in the plasma of the plasma burner;
   metering fuel into the mixing chamber and in a subsequent ignition phase the fuel is ignited by the plasma, and in a subsequent heating phase the plasma is turned off; and
   additionally metering fuel into the mixing chamber and combusting the fuel and in a subsequent hydrogen production phase, ending the fuel combustion and vaporizing the fuel in the mixing chamber.

2. A method according to claim 1, wherein the fuel is delivered to the mixing chamber upstream from the plasma chamber.

3. A method according to claim 1, wherein the fuel is delivered to the mixing chamber downstream from the plasma chamber and the plasma is fed into the mixing chamber.

4. A method according to claim 1, wherein the plasma is additionally operated for a selective time duration, preferably for a time duration between one and five seconds, after a beginning of the metering in of the fuel.

5. A method according to claim 1, wherein the fuel is vaporized before combustion on a hot surface area, which was heated during the nitrogen oxide production phase, of the mixing chamber located either downstream or upstream from the plasma chamber.

6. A method of heating up a reducing agent generation system of an exhaust gas aftertreatment system of an internal combustion engine by combustion of fuel, the reducing agent generation system comprising a plasma burner, a mixing chamber located downstream or upstream from the plasma chamber, an oxidation reformation unit, and a combined nitrogen oxide storage and ammonia production unit, the method comprising producing the reducing agent for selective catalytic reduction of nitrogen oxides in an exhaust gas of the internal combustion engine in the intermittently operated reducing agent generation system; and producing nitrogen oxide in a plasma in the plasma burner, wherein the combustion of the fuel is ignited by the plasma, wherein the fuel or the air delivered in a counter flow is warmed on an outside cladding of the plasma burner.

7. A device to heat a reducing agent generation system of an exhaust gas aftertreatment system of an internal combustion engine by combustion of fuel, which is metered in by way of a fuel metering mechanism, whereby the reducing agent generation system comprises a plasma burner, an oxidation reformation unit, and a combined nitrogen oxide storage/ammonia production unit for the intermittent production of ammonia from fuel and air or exhaust gas for selective catalytic reduction of nitrogen oxides in an exhaust gas of an internal combustion engine, wherein a plasma of the plasma burner ignites the fuel, wherein the plasma burner is configured to produce nitrogen oxide in a nitrogen oxide production phase, in the plasma of the plasma burner; to meter fuel into the mixing chamber and in a subsequent ignition phase the fuel is ignited by the plasma, and in a subsequent heating phase the plasma is turned off; and additionally to meter fuel into the mixing chamber and combusting the fuel and in a subsequent hydrogen production phase, to end the fuel combustion and vaporizing the fuel in the mixing chamber.

8. A device according to claim 7, wherein a housing of the plasma burner has a tapered interior area in the area in the direction of gas flow succeeding the plasma chamber.

9. A device according to claim 7, further including a flame holder between the fuel metering mechanism and the ignition area.

10. A device according to claim 7, further including two fuel metering mechanisms or a joint fuel metering mechanism for the fuel delivery during heating and for the fuel delivery during a $H_2$/CO production phase.

11. A device according to claim 7, wherein the plasma of the plasma burner is developed into one or more plasma jet zones.

12. A device according to claim 11, wherein the plasma jet zones are disposed tangentially around an ignition area or linearly along an ignition area.

* * * * *